Sept. 18, 1962 W. COULSON 3,054,189
ADAPTER FOR DIAL INDICATOR GAUGE
Filed Oct. 23, 1959
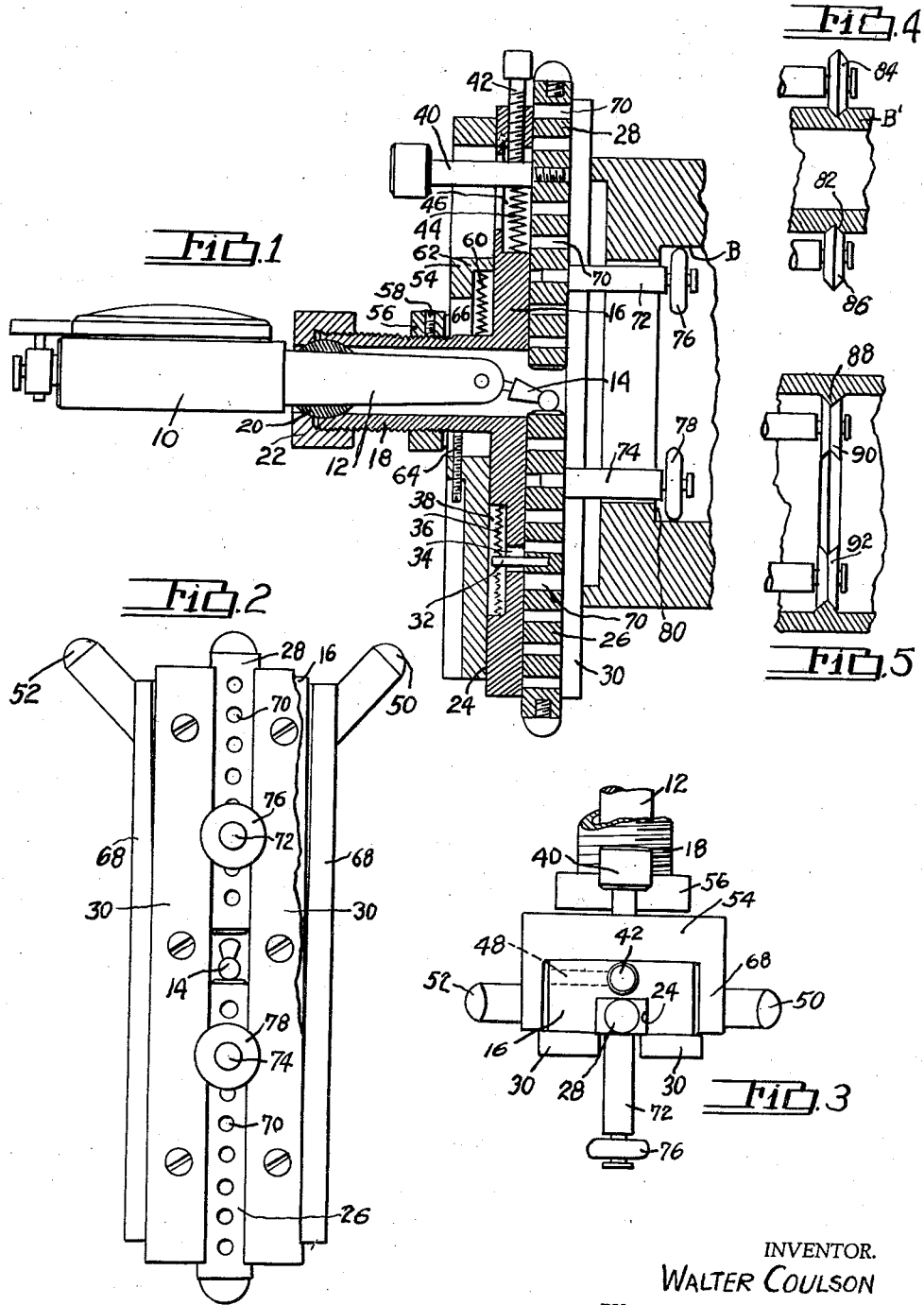
INVENTOR.
WALTER COULSON
BY
ATTORNEY

United States Patent Office 3,054,189
Patented Sept. 18, 1962

3,054,189
ADAPTER FOR DIAL INDICATOR GAUGE
Walter Coulson, Detroit, Mich.
(336 8th Ave. NE., St. Petersburg 1, Fla.)
Filed Oct. 23, 1959, Ser. No. 848,316
1 Claim. (Cl. 33—147)

This invention relates to a bore diameter checking gauge and more particularly to a gauge adapted for use with a standard dial indicator.

It is an object of the present invention to provide an inexpensive device which may be readily attached to a standard dial indicator commonly found in practically all machine and tool shops where precision is required for accurately measuring diameters.

Another object of the invention is to provide slidable self compensating equalizing pins co-operating with a sizing or contact pin, wherein the equalizing pins slide in parallel relation to the sizing pin.

A further object of the invention is to provide angularly disposed equalizing pins which are carried by an adjustable slide having its movement parallel to the axis of the sizing pin and movable transversely to the axis of the sizing pin.

A still further object of the invention is to provide an adapter for supporting a sizing pin, movable radially with respect to the bore being checked, with means for translating the radial movement of the sizing pin to axial movement for indicating the movement on a dial indicator.

Other objects and advantages of the invention will be more fully understood from the following description taken in connection with the accompanying drawings, in which:

FIG. 1 is a longitudinal cross-sectional view through the improved adapter applied to a dial indicator shown in side elevation;

FIG. 2 is a front elevational view of the adapter shown in FIG. 1;

FIG. 3 is a top plan view of the adapter;

FIG. 4 is a fragmentary, cross-sectional view showing the use of the gauge in measuring grooves in the outer periphery of a cylindrical member; and FIG. 5 is a fragmentary, cross-sectional view showing the use of the gauge in measuring a rib on the inner periphery of a cylindrical member.

Referring to the drawings, I have shown a standard, conventional dial indicator 10 having a shank 12 supporting a contact arm 14 pivoted to the shank 12 which contacts the dial indicating means.

A head portion 16 has a sleeve portion 18 which fits over the shank 12 and which is held thereon by a split spherical ring 20 pressed against the end of the sleeve 18 by a nut 22 threaded to the outer end of the sleeve portion 18. The head 16 is provided with a longitudinal channel 24 in its front face for receiving slide members which are hereinafter referred to as a sizing pin 26 and an adjustably positioned locating pin 28. The pins 26 and 28 are held in the channel 24 by spaced face plates 30 secured to the front face of the head portion 16. The sizing pin 26 has its inner end in contact with the contact arm 14 for moving the latter. It is also provided with a rearwardly extending pin 32 which is movable in a slot 34 formed in the head portion 16. A resilient means 36 is located in a slot 38 formed in the head 16 and urges the pin 32 and sizing pin 26 in a direction outwardly from the head 16.

The inner end of the locating pin 28 is spaced from the contact arm 14. This pin 28 may be considered as an adjustably fixed pin in so far as its outward movement is considered. A screw 40 projecting rearwardly from the back face of the pin is forced against an adjustable stop screw 42 by a compression spring 44 in a recess 46 in the head 16. A set screw 48 is provided for the stop screw 42.

In addition to the sizing pin 26 and the locating pin 28, I have provided equalizing pins 50 and 52 at the opposite sides of the locating pin 28, to assure that the sizing pin 26 cooperating with the distal end of the sizing pin 26, and locating pin 28 are located on a true diameter of the bore being measured. These pins 50 and 52 are carried by a slide cross head 54 adjustable longitudinally along the head portion 16. The slide cross head 54 is located to the desired position, depending upon the diameter of the bore, by a lock collar 56 screw threaded on the sleeve 18, pressing the cross head into tight engagement with the back face of the head portion 16. A set screw 58 is provided for retaining the lock collar in position. A compression spring 60, compressed between a shoulder 62 on the cross head 54 and the sleeve 18 of the head 16 urges the cross head and its equalizing pins in a direction outwardly of the head portion 16 against an adjustable screw stop 64 carried by the cross head 54 having contact engagement with the lower surface of the sleeve 18. A slot 66 permits the longitudinal movement of the cross head relative to the head 16. The cross head 54 is channel shaped having a back wall and side walls 68 which extend over the side edges of the head portion 16. The inner faces of the side walls 68 are tapered outwardly in divergent relation so that the inner faces at the bottom have sliding fit with the outer side edges of the head portion 16 and the inner faces at the top are free for transverse movement relative to the head portion 16; the bottom portion acting as a fulcrum permitting the upper portion of the cross head 54 to shift relative to the head portion 16. By this arrangement the equalizing pins 50 and 52 have a floating action which permits the sizing pin 26 to be located on a true diameter of the bore being measured.

The locating pin 28 and the sizing pin 26 are provided with a plurality of longitudinally spaced apertures 70. A forwardly projecting pin 72 may be located in any one of the apertures in the locating pin 28 and another forwardly projecting pin 74 is located in any one of the apertures in the sizing pin 26. Rotatable contact members 76 and 78 are located on the outer ends of the pins 72 and 74. These are to be used for measuring recesses or counterbores in a member such as shown at B having a flanged end surface 80. When it is desired to measure the bore, the locating pin 28 is pushed inwardly against the compression of the spring 44 to permit the contact members 76 and 78 to clear the flange 80. The sizing pin 26 may also be moved inwardly against the pressure of the spring 36 within the limits of the wall of the slot 34. When pressure has been released the locating pin 28 returns to its predetermined position located by the screw 40 contacting the inner end of the screw 42 and the contact members 76 and 78 contacting the inner periphery of the recessed bore.

If it is desired to measure a recess 82 in the outer periphery of a member B', FIG. 4, the spring 36 is placed on the opposite side of the pin 32, in the recess 38, as shown in dotted lines, urging the sizing pin 26 inwardly. The spring in this new location will permit outward movement of the sizing pin 26 to permit the rollers to slide over the outer periphery of the member B' and when in position, to be forced into the groove in the member B'.

A V-shaped rib 88 on the internal periphery may be measured with V-shaped rollers 90 and 92 as shown in FIG. 5 by merely reversing the location of the spring 36.

While I have illustrated and described one embodiment of the invention it is to be understood that various changes including the size, shape and arrangement of parts may be made without departing from the spirit of the invention and it is my intention to cover by the appended claim such changes as may be included within a reasonable interpretation of the meaning of the terms therein.

I claim:

An adapter for a dial gauge indicator having a shank portion carying a resilient movement transmitting member for actuating the dial indicator comprising, a sleeve adapted to be secured to the shank portion of the dial indicator, a head portion carried by said sleeve, an axially aligned locating pin and a sizing pin carried by said head portion, said sizing pin having axial sliding movement relative to said head portion and in operative engagement with the resilient movement transmitting member of the dial indicator, a cross head slidably mounted on said head portion, outwardly divergent arms carried by said cross head spaced on opposite sides of said locating pin, equalizing pins adjustably carried by said arms being free for limited movement transversely of said head portion and cooperating with said locating pin, resilient means for urging said cross head longitudinally of said head portion, and adjustable stop means for limiting the longitudinal movement of said cross head.

References Cited in the file of this patent

UNITED STATES PATENTS

| | | |
|---|---|---|
| 2,412,421 | Polk et al. | Dec. 10, 1946 |
| 2,648,134 | Billeter | Aug. 11, 1953 |
| 2,654,157 | Eisele | Oct. 6, 1953 |
| 2,805,481 | Locke | Sept. 10, 1957 |
| 2,873,533 | Wilson | Feb. 17, 1959 |